US012702627B2

(12) United States Patent
Kim et al.

(10) Patent No.: US 12,702,627 B2
(45) Date of Patent: Aug. 11, 2026

(54) BABY BOTTLE WITH RIBS ON INNER SURFACE OF NIPPLE

(71) Applicant: Comotomo 2022 Inc., Sunnyvale, CA (US)

(72) Inventors: Sang-Pyo Kim, Los Altos, CA (US); Yong Hyun Kyung, Gwangmyeong-si (KR)

(73) Assignee: Comotomo 2022 Inc., Sunnyvale, CA (US)

(*) Notice: Subject to any disclaimer, the term of this patent is extended or adjusted under 35 U.S.C. 154(b) by 44 days.

(21) Appl. No.: 18/787,190

(22) Filed: Jul. 29, 2024

(65) Prior Publication Data

US 2025/0099339 A1 Mar. 27, 2025

Related U.S. Application Data

(60) Provisional application No. 63/584,180, filed on Sep. 21, 2023.

(51) Int. Cl.
*A61J 11/00* (2006.01)
*A61J 11/04* (2006.01)
(Continued)

(52) U.S. Cl.
CPC ............ *A61J 11/002* (2013.01); *A61J 11/008* (2013.01); *A61J 11/04* (2013.01); *B29C 45/37* (2013.01);
(Continued)

(58) Field of Classification Search
CPC ........ A61J 11/002; A61J 11/008; A61J 11/04; A61J 9/005; A61J 9/00; B65D 1/0246;
(Continued)

(56) References Cited

U.S. PATENT DOCUMENTS 1,146,639 A * 7/1915 Miller ........................ A61J 9/04 215/11.5
3,946,888 A * 3/1976 Tonkin ................. A61J 11/0065 215/11.5

(Continued)

FOREIGN PATENT DOCUMENTS

WO WO 2016-167523 A1 10/2016

OTHER PUBLICATIONS

International Search Report of PCT/US2024/041362 mailed on Nov. 21, 2024.
Written Opinion of the International Searching Authority of PCT/US2024/041362 mailed on Nov. 21, 2024.

*Primary Examiner* — Robert J Hicks
(74) *Attorney, Agent, or Firm* — WTA IP Law P.C.

(57) ABSTRACT

Embodiments relate to a baby bottle having a nipple with enhanced resilience against flexing of its body during bottle-feeding use. The nipple has ribs extending in a slanted direction on its inner surface to enhance its elastic recovery elongation or contraction during a bottle-feeding cycle. Some of the ribs may extend into an elongated tip of the nipple to enhance the recovery of the elongated tip from its collapse or compression. The ribs enable the nipple to remain thin while providing sufficient elasticity so that the nipple has a desirable tactile feel while supporting a natural bottle-feeding action. Embodiments also relate to a container of the baby bottle having a rigid cylinder and a resilient body secured to the rigid cylinder. The rigid cylinder has a structure to secure the resilient body formed onto the rigid cylinder by an injection molding process.

20 Claims, 10 Drawing Sheets

(51) Int. Cl.
*B29C 45/37* (2006.01)
*B29K 83/00* (2006.01)
*B29L 31/00* (2006.01)

(52) U.S. Cl.
CPC ... *B29K 2083/00* (2013.01); *B29L 2031/7412* (2013.01)

(58) Field of Classification Search
CPC ........................... B65D 1/023; B65D 51/1683; B65D 51/1644; B65D 51/1661; B29L 2031/7412
USPC ........ 215/11.4, 11.1, 11.5, 11.6, 44, 43, 314, 215/311, 307
See application file for complete search history.

(56) References Cited

U.S. PATENT DOCUMENTS

| | | | | |
|---|---|---|---|---|
| 6,716,386 | B2 | 4/2004 | Saito et al. | |
| 8,833,575 | B2 * | 9/2014 | Fave-Lesage | A61J 11/004 215/11.4 |
| 2017/0112720 | A1 * | 4/2017 | Wagenknecht | A61J 11/045 |
| 2019/0099330 | A1 | 4/2019 | Roehrig | |
| 2020/0022872 | A1 | 1/2020 | Touati | |
| 2021/0322276 | A1 | 10/2021 | Piraud et al. | |

* cited by examiner

BABY BOTTLE WITH RIBS ON INNER SURFACE OF NIPPLE

CROSS-REFERENCE TO RELATED APPLICATION

This application claims priority to U.S. Provisional Patent Application No. 63/584,180, filed on Sep. 21, 2023, which is incorporated by reference herein in its entirety.

BACKGROUND

1. Field of Art

The disclosure relates to a baby bottle, more specifically to a baby bottle with a resilient nipple.

2. Description of the Related Art

Baby bottles are designed to feed infants with liquid formula or expressed breast milk. A baby bottle generally includes a container that holds the liquid, a nipple through which an infant receives the milk or formula, and a collar that screws the nipple onto the bottle body. These components are often designed for easy disassembly to ensure prompt and thorough cleaning for hygiene reasons. The design of the baby bottles are also simplified to the extent possible to facilitate sterilization and maintenance of the baby bottles.

The nipple of a baby bottle undergoes various deformation during use. The nipple is generally designed to mimic a mother's breast, providing comfort and familiarity to the baby while controlling flow rates to prevent choking or overfeeding. Specifically, as the baby latches onto the nipple and begins to suck, the nipple compresses slightly in response to the baby's sucking action and allows milk to be released into the baby's mouth. Further, when the baby sucks on the nipple, it stretches and elongates slightly, similar to how a mother's breast changes shape during breastfeeding. After the baby's initial suck, there is a brief pause where the nipple returns to its original shape, which allows the baby to swallow the milk before starting the next sucking cycle. To enhance such natural bottle-feeding cycle, the nipple resiliently shifts in its shape during use while recovering its original shape once the feeding cycle is complete.

In addition, the components of the baby bottle should be friendly to infants, preferably aesthetically pleasing to users, and have sufficient durability to last through extended use. Accordingly, it is challenging to design the components of the baby bottle that satisfy such various needs and demands.

SUMMARY

Embodiments relate to a nipple for a baby bottle with one or more ribs on its inner surface to enhance elastic recovery of the nipple. The nipple includes an elongated tip and a base. The elongated tip is formed with one or more flow holes through which fluid flows. The elongated tip has an inner surface and an outer surface. The base is connected to the elongated tip and is wider than the elongated tip. The base includes an inner surface and an outer surface. The inner surface of the base faces towards a container of the baby bottle and is connected to the inner surface of the elongated tip. The outer surface of the base faces away from the container and is connected to the outer surface of the elongated tip. The one or more ribs are provided on at least a part of the inner surface of the base to enhance elastic recovery of the nipple from elongation or contraction of the base in its axial direction. A portion of the one or more ribs in the inner surface is slanted relative to an axial direction of the nipple.

In one or more embodiments, a subset of the one or more ribs extends into the inner surface of the elongated tip to enhance elastic recovery of the elongated tip from collapse or compression in a radial direction of the nipple.

In one or more embodiments, the one or more ribs other than the subset of the one or more ribs start and terminate within the inner surface of the base.

In one or more embodiments, the one or more ribs include three sets of ribs. The portions of ribs on the inner surface of the base are oriented in different directions.

In one or more embodiments, the three sets of ribs include a first set of ribs oriented in a first direction and a second set of ribs oriented in a second direction. A projection of the first direction onto a plane perpendicular to the axial direction forms an angle of 120 degrees relative to a projection of the second direction onto the plane.

In one or more embodiments, the first set of ribs includes an adjacent series of ribs of which portions extend into the elongated tip, and another adjacent series of ribs that do not extend into the elongated tip.

In one or more embodiments, the nipple further includes at least one check valve in the base.

In one or more embodiments, the one or more ribs are located between at least one check valve and the one or more flow holes.

In one or more embodiments, a thickness of the base at locations without the one or more ribs is between 1.5 mm and 6 mm and a thickness of the elongated tip at locations without the one or more ribs is between 0.5 mm and 1.5 mm.

In one or more embodiments, the elongated tip, the base and the one or more ribs form a unitary body.

In one or more embodiments, the elongated tip, the base and the one or more ribs are made of silicone.

In one or more embodiments, the elongated tip, the base and the one or more ribs are fabricated simultaneously by an injection molding.

In one or more embodiments, the outer surface of the base is formed with a plurality of flow indicators, and a marking associated with one of the flow indicators.

In one or more embodiments, the base further includes a flange that is captured by a collar to secure the nipple to the container.

Embodiments also relate to a container for a baby bottle that includes a rigid cylinder with a ring extending along the circumference of the rigid cylinder and a resilient body attached to the rigid cylinder. The rigid cylinder includes a first side surface formed with a screw for securing to a collar of the baby bottle, a second side surface at an opposite side of the first surface, a top surface connecting the first side surface and the second side surface, and the ring that extends along a circumference of the second surface and connected to the second surface. The resilient body includes an upper portion with an opening end and secured to the rigid ring by receiving the ring of the rigid cylinder in a cavity formed along an upper circumference of the upper portion. The resilient body also includes a lower portion with a closed end and extending from the upper portion.

In one or more embodiments, the resilient body is made of silicone.

In one or more embodiments, the ring has a thickness between 0.3 mm and 0.8 mm.

In one or more embodiments, the top surface of the rigid cylinder has a thickness between 0.5 mm to 1.5 mm.

In one or more embodiments, the first side surface is an outer surface of the container, and the second side surface is an inner surface of the container.

In one or more embodiments, the ring is connected to the second surface by a plurality of bridges where each of the bridges is separated by a predetermined distance.

In one or more embodiments, the second side of the ring is deposited with a silicon compound layer for enhancing attachment between the rigid cylinder and the resilient body.

Embodiments also relate to fabricating of a container for a baby bottle using an injection molding process. A rigid cylinder is mounted onto a first core. The rigid cylinder has an outer surface, an inner surface at an opposite side of the outer surface, and a top surface connecting the inner surface and the outer surface. The top surface contacts the first core. A relative motion is made between the first core and a second core to place the rigid cylinder within a cavity of the second core. The rigid cylinder is secured within the cavity of the second core by clamping the outer surface of the rigid cylinder to a clamp. Fluid of resilient material is injected between the first core and the second core, the injected fluid contacting the inner surface of the rigid cylinder. The leakage of the fluid is prevented by the contact of the top surface with the first core and contact between the outer surface and the clamp. The injected fluid is solidified.

In one or more embodiments, the outer surface of the rigid cylinder is formed with a screw.

In one or more embodiments, the rigid cylinder is secured by moving the clamp in a direction that is perpendicular to a direction of the relative motion between the first core and the second core.

Embodiments also relate to a baby bottle including a nipple with one or more ribs on its inner surface. The baby bottle includes a nipple and a container. The nipple includes an elongated tip, a base and the one or more ribs. The elongated tip is formed with one or more flow holes through which fluid flows and has an inner surface and an outer surface. The base is connected to the elongated tip and is wider than the elongated tip. The base includes an inner surface facing towards a container of the baby bottle and connected to the inner surface of the elongated tip. The outer surface of the base faces away from the container and is connected to the outer surface of the elongated tip. The one or more ribs enhance elastic recovery of the nipple from elongation or contraction of the base in an axial direction of the nipple. A portion of the one or more ribs in the inner surface is slanted relative to an axial direction of the nipple.

In one or more embodiments, the baby bottle further includes a collar for sealingly securing the nipple to the container.

In one or more embodiments, the container includes a rigid cylinder and a resilient body. The rigid cylinder includes a first side surface formed with a screw for securing to a collar of the baby bottle, a second side surface at an opposite side of the first surface, a top surface connecting the first side surface and the second side surface, and a ring extending along the circumference of the second surface and connected to the second surface. The resilient body includes an upper portion with an opening end and secured to the rigid ring by receiving the ring of the rigid cylinder in a cavity formed along an upper circumference of the upper portion, and a lower portion with a closed end and extending from the upper portion.

DETAILED DESCRIPTION OF EMBODIMENTS

Figure 1:
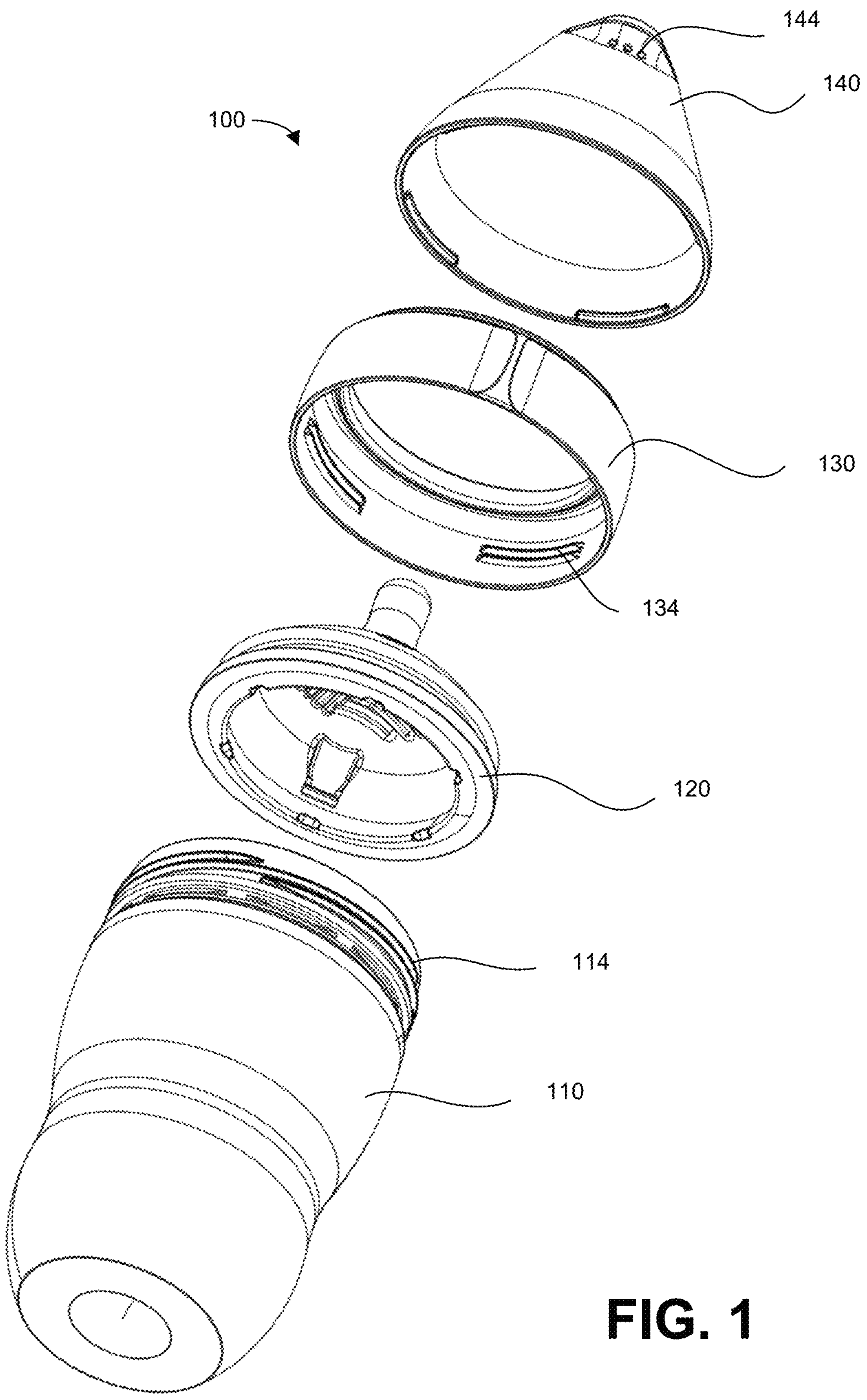
FIG. 1 is an exploded view of a baby bottle, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements. The shape, size and regions, and the like, of the drawings may be exaggerated for clarity.

Embodiments relate to a baby bottle having a nipple with enhanced resilience against flexing of its body during bottle-feeding use. The nipple has ribs extending in a slanted direction on its inner surface to enhance its elastic recovery elongation or contraction during a bottle-feeding cycle. Some of the ribs may extend into an elongated tip of the nipple to enhance the recovery of the elongated tip from its collapse or compression. The ribs enable the nipple to remain thin while providing sufficient elasticity so that the nipple has a desirable tactile feel while supporting a natural bottle-feeding action. Embodiments also relate to a container of the baby bottle having a rigid cylinder and a resilient body secured to the rigid cylinder. The rigid cylinder has a structure to secure the resilient body formed onto the rigid cylinder by an injection molding process.

FIG. 1 is an exploded view of a baby bottle 100, according to one embodiment. Baby bottle 100 may include, among other components, a container 110, a nipple 120, a collar 130, and a lid 140. These components may be easily disassembled for cleaning and/or replacement. In the embodiment of FIG. 1, baby bottle 100 is of a cylindrical shape but baby bottle 100 may also be of various other shapes. Baby bottle 100 may also include components not illustrated in FIG. 1.

Container 110 is a component for holding fluid such as liquid formula or expressed breast milk. Container 110 has an open top end and a closed bottom end. Container 110 may include a rigid cylinder 1010 and a resilient body 1040 attached to rigid cylinder 1010. Rigid cylinder 1010 has a screw 114 formed on its outer surface to engage with a counterpart screw 134 formed on an inner surface of collar 130. Rigid cylinder 1010 may also be structured to secure resilient body 1040 during and after the manufacturing process. Resilient body 1040 has a soft and elastic feel that is comfortable for an infant or a caregiver to hold onto. Container 110 may be of various shapes and sizes to accommodate varying needs and demands. In one or more embodiments, resilient body 1040 may be formed onto rigid cylinder 1010 by an injection molding process, as described below in detail with reference to FIGS. 14A through 14F.

Nipple 120 is placed on container 110 and enables feeding of the liquid in container 110 through one or more holes 214 formed at the top of elongated tip 218. Nipple 120 may flex in axial and/or radial direction during the bottle-feeding, and has sets of ribs 320A, 320B, 320C formed in its inner surface 330, as described below in detail with reference to FIGS. 3 through 8. Nipple 120 is made of resilient material such as silicone.

Collar 130 screws onto container 110 with nipple 120 between collar 130 and container 110. Collar 130 may be made of a rigid material and have screw 134 formed on its inner surface to engage screw 114. A caregiver may simply place nipple 120 under collar 130 and screw collar 130 onto screw 114 in a direction to assemble baby bottle 100. To disassemble baby bottle 100, the caregiver may rotate collar 130 in a reverse direction to remove collar 130 from container 110. In one embodiment, collar 130 may sealingly compress flange 230 of nipple 120 onto the top of container 110 so that the fluid in container 110 does not leak during the bottle-feeding.

Lid 140 is placed on top of baby bottle 100 to prevent contamination of nipple 120 when baby bottle 100 is not in use. Specifically, lid 140 may be snapped onto collar 130 when not in use, or be removed from collar 130 for use. Lid 140 may have perforations 144 to function as air vents that enable easy placing of lid 140 onto collar 130 and easy removal of lid 140 from collar 130.

Each of the components of baby bottle 100 in FIG. 1 is illustrated as being of a unitary body. However, in other embodiments, all of some of the components may consist of multiple discrete parts that may be assembled or disassembled. Moreover, some of the components may be combined into a single body. For example, nipple 120 may be combined with collar 130 into a single body.

Figure 2:
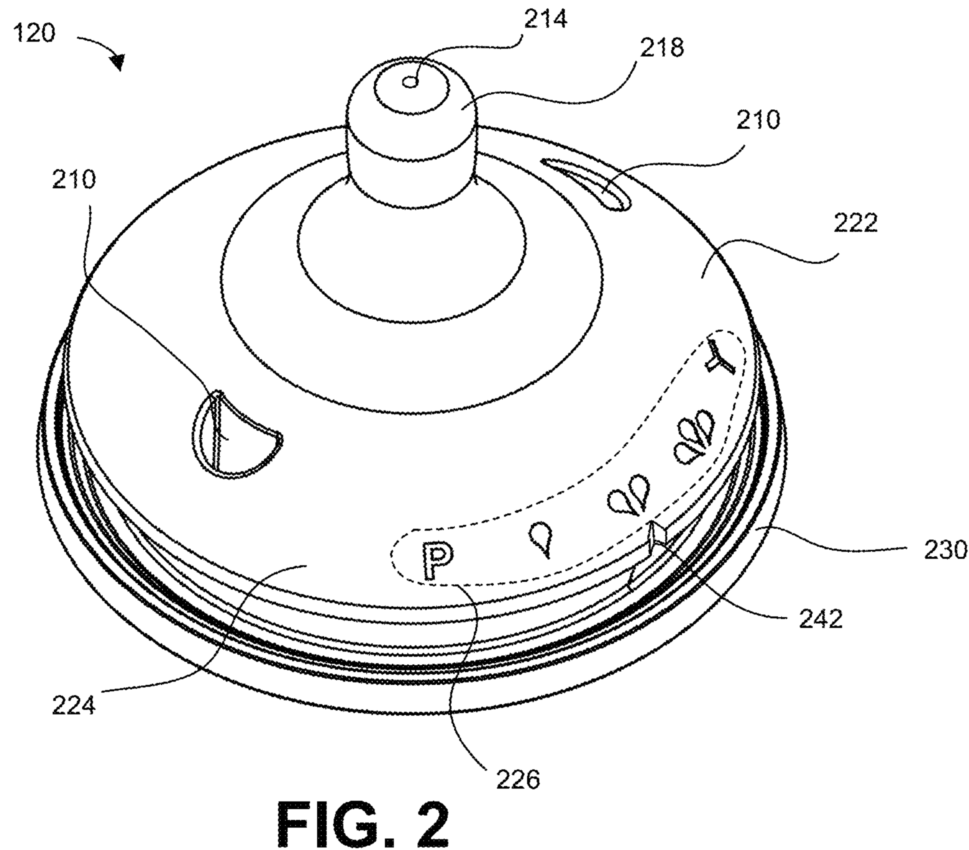
FIG. 2 is a perspective view of a nipple of the baby bottle, according to one embodiment.

FIG. 2 is a perspective view of nipple 120 taken from an upper position, according to one embodiment. Nipple 120 is made of a resilient and pliable material, and mimics the feel and flow of a mother's breast during breastfeeding. Nipple 120 may include, among other components, a base 222, an elongated tip 218 extending upward from base 222, and flange 230 extending radially from the bottom of base 222. Nipple 120 may also include features not illustrated in FIG. 2.

Base 222 is wider than elongated tip 218 and is of a domed shape. Base 222 is formed with vent holes 210 at opposite radial sides of nipple 120. Fewer or more vent holes may be provided. Base 222 has an inner surface 330 that faces toward container 110 and an outer surface 224 that faces away from container 110. Base 222 may also have flange 230 at its bottom.

Elongated tip 218 extends upward from base 222 and comes into direct contact with an infant's mouth. At the top of elongated tip 218, one or more holes 214 are formed to enable fluid to pass through. Elongated tip 218 has an inner surface 808 and an outer surface 802. Inner surface 808 and outer surface 802 of elongated tip 218 extend from inner surface 330 and an outer surface 224 of base 222, respectively.

Base 222 may also include flow indicators 226 on its outer surface 224. Flow indicators 226 are visual indications of stipulated flow rate of fluid passing through one or more holes 214 at the top of the elongated tip 218. Different nipples may have different flow rates suitable for development stages of infants. Flow indicators 226, in conjunction with a marking, indicate the flow rate of the current nipple. The marking may be in the form of notch 242 provided at the edge of base 222. Markings other than a notch may be used to indicate the flow rate. For example, a sticker, a pattern or an indent may be provided at a location corresponding to the flow rate of the nipple.

Each nipple may have all flow rates available to the product line of baby bottles shown on base 222. In this way, the caregiver may understand the range of flow rates available and which one of these flow rates is provided by the current nipple through identifying the location of the marking.

In one or more embodiments, nipple 120 is made of a resilient material that is tested for safety for human use. For example, nipple 120 may be made of silicone, latex rubber, thermoplastic elastomers (TPE) or thermoplastic rubber (TPR). Further, nipple 120 may be of a single unitary body and the entire nipple may be formed simultaneously, for example, using an injection molding process.

Figure 3:
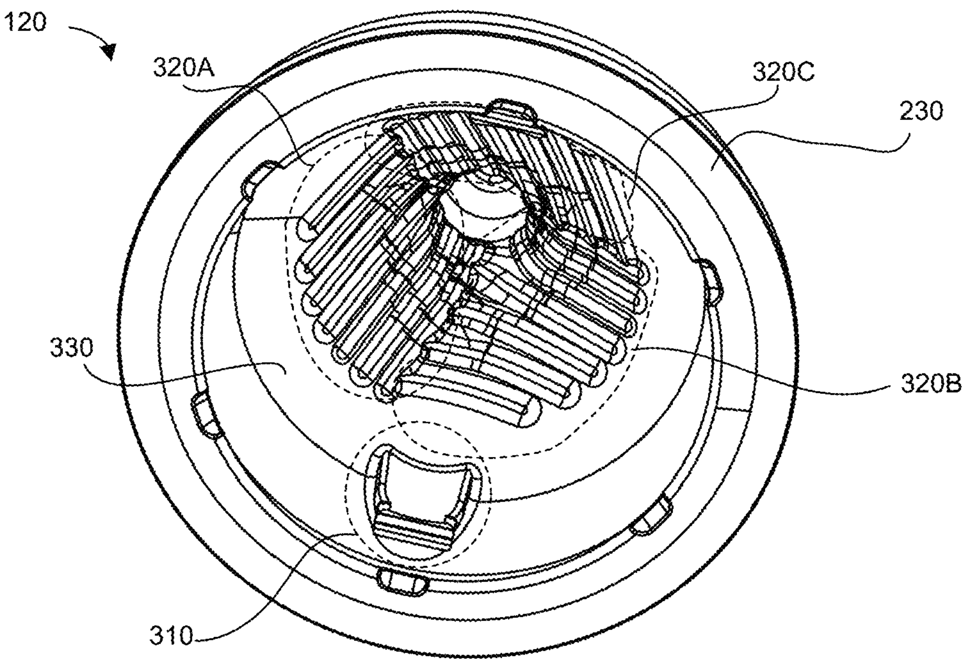
FIG. 3 is another perspective view of the nipple of the baby bottle, according to one embodiment.

FIG. 3 is a perspective view of nipple 120 taken from a lower position, according to one embodiment. Inner surface 330 has sets of ribs 320A, 320B, 320C that enhance elastic recovery of nipple 120 from flexing actions. Flange 230 is provided at the bottom of nipple 120 to engage the top opening of container 110.

Ribs 320A, 320B, 320C are located on the inner surface 330 of nipple 120 in a region between check valves 310 and the one or more holes 214 of the elongated tip 218. Ribs 320A, 320B, 320C have sectional profiles that protrude downward from inner surface 330 and extend longitudinally in a direction that is slanted relative to axial direction DA of nipple 120 when viewed from the side of nipple 120 (see FIG. 6). Ribs in the same set of ribs are generally oriented longitudinally in the same direction along inner surface 330. While some of the ribs start and end in base 222, other ribs extend into elongated tip 218, as shown more clearly in FIGS. 4 and 5.

Base 222 also includes one or more check valves 310 with vent holes 210. Check valves 310 allow air to flow in through vent holes 210 but prevent fluid from leaking out through vent holes 210. In other embodiments, one or more check valves 310 may be provided at other locations of nipple 120 or they may be included in other components of baby bottle (e.g., collar).

Figure 4:
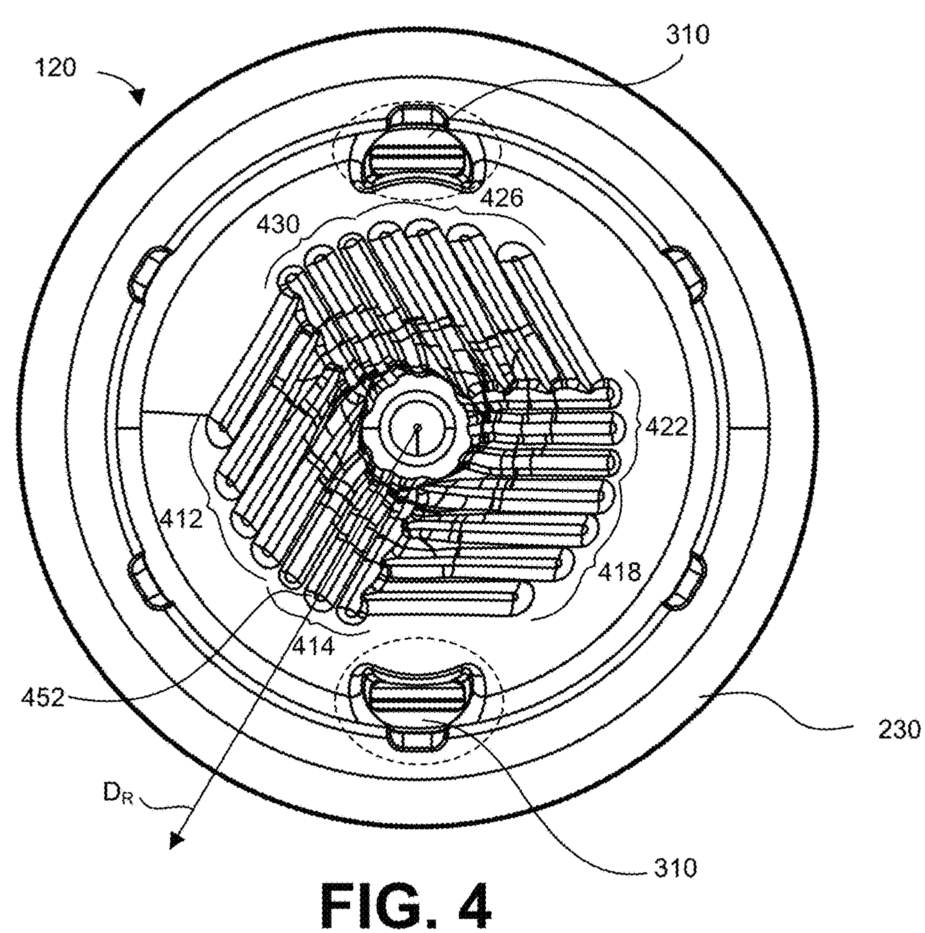
FIG. 4 is a bottom view of the nipple of the baby bottle, according to one embodiment.

FIG. 4 is a bottom view of nipple 120, according to one embodiment. Portions of ribs within the same set 320A, 320B, 320C are generally oriented in the same direction when viewed from the bottom. Each set 320A, 320B, 320C of ribs include a first subset 412, 418, 426 of ribs and a second subset 414, 422, 430 of ribs. The first subsets 412, 418, 426 of ribs start and end within base 222 while second subsets 414, 422, 430 of ribs extend vertically into the inner surface of elongated tip 218.

Figures 9A, 9B, 9C:
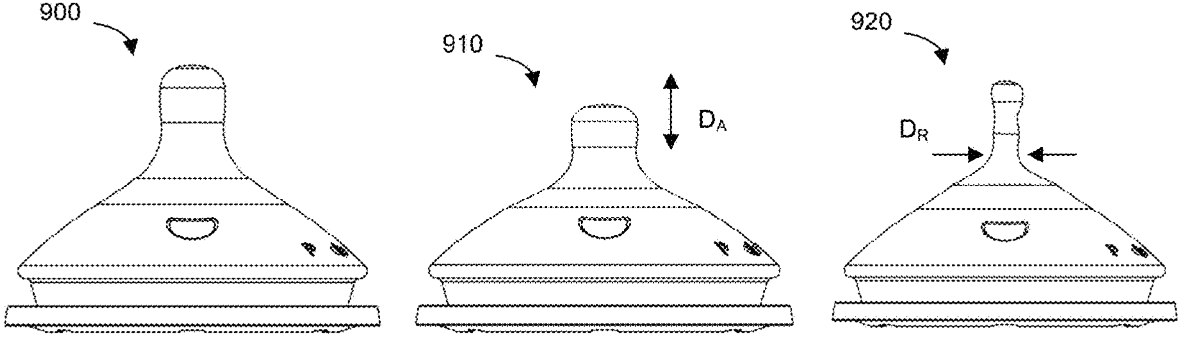
FIGS. 9A through 9C are diagrams showing flexing of the nipple, according to one embodiment.

The first subsets 412, 418, 426 of ribs function to enhance the elastic recovery of nipple 120 from an axially elongated or compressed state 910 (for example, as shown in FIG. 9B) back to its original shape 900 (for example, as shown in FIG. 9A). The second subsets 412, 418, 426 of ribs have portions on base 222, which serves the same function as the first subsets 412, 418, 416 of ribs, but also includes portions on the inner surface of elongated tip 218, which enhances the elastic recovery of elongated tip 218 from its radial deformed state 920 (for example, as shown in FIG. 9C) back to its original shape 900 (for example, as shown in FIG. 9A). The ribs advantageously enable nipple 120 to retain an overall thin profile that gives a soft and flexible tactile feeling to the infants while enhancing the elasticity and strength of nipple 120.

The interval, size, shape and/or the number of ribs may differ depending on material and the desired resilience and strength of nipple 120. The ratio and profile of ribs extending into elongated tip 218 relative to those of the ribs extending only within base 222 may also depend on similar factors as well as the overall dimensions of nipple 120. Another factor to consider in determining the configuration of the ribs is the capillary trapping of fluid droplets within the valleys between the ribs. If the interval or gap between the ribs is too small, droplets of fluid tend to get stuck between the valleys and not flow back down, which may adversely affect cleaning or sanitization of nipple 120. Hence, the interval or gap between the ribs may be set to be above a predetermined distance to prevent such capillary trapping of fluid droplets. Taking these considerations into account, when silicone is used as the material for nipple 120, the height of the ribs may be, for example, between 0.2 mm and 1 mm.

In one or more embodiments, a portion of at least one of the ribs in a set of ribs extends in a radial direction DR when viewed from the bottom. For example, rib 452 has its portion in base 222 extend in the radial direction DR when viewed from the bottom, as illustrated in FIG. 4. Other ribs in the same set (e.g., 320A) generally have their portions in base 222 extend longitudinally in the same direction as rib 452 when viewed from the bottom. That is, versions of ribs projected down onto a plane perpendicular to axial direction DA has at least one extending in a radial direction and other ribs extend longitudinally in the same direction as the at least one rib.

In one or more embodiments, a set of ribs (e.g., set 320A) has portions on base 222 generally extend along a first direction while another set of ribs (e.g., set 320B) has portions on base 222 that generally extend along a second direction, and the last set of ribs (set 320C) generally extend along a third direction. When the first, second and third directions are projected onto a plane that is perpendicular to axial direction DA of nipple 120, the projected versions of the first, second and third directions may form an angle of 120 degrees relative to each other.

Figure 5:
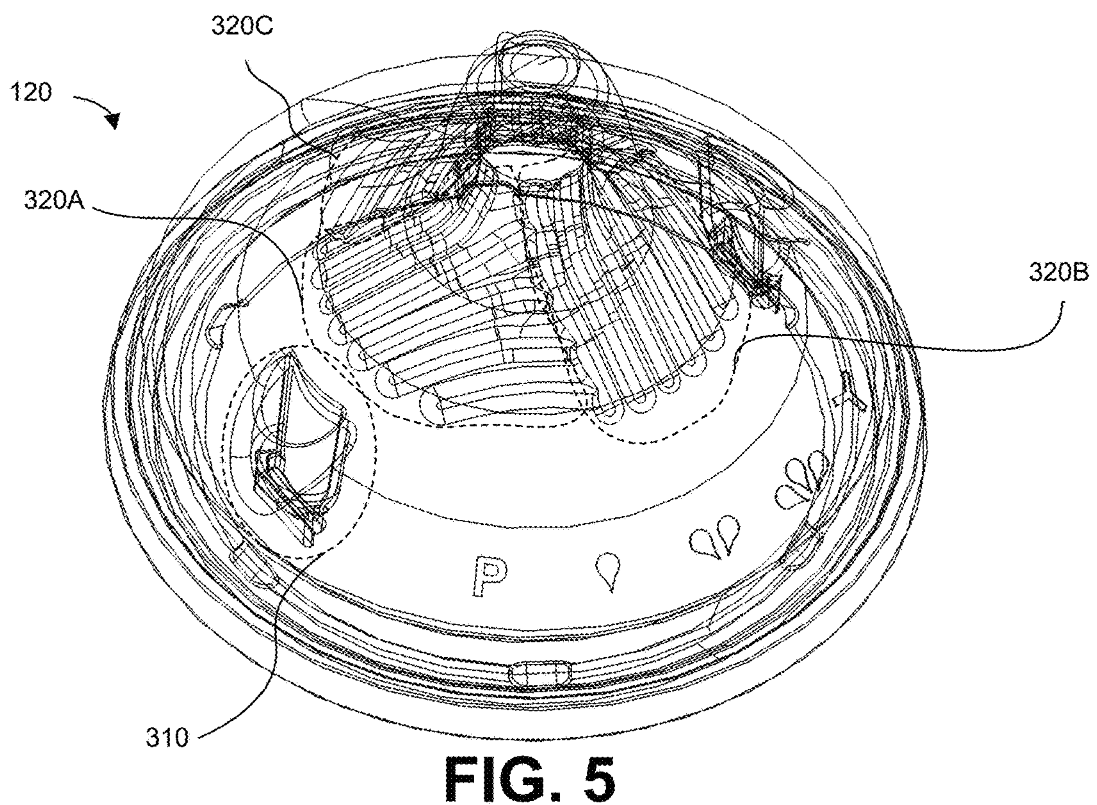
FIG. 5 is a transparent view of the nipple of the baby bottle, according to one embodiment.

FIG. 5 is a transparent view of nipple 120, according to one embodiment. In the embodiment of FIG. 5, portions of ribs in elongated tip 218 generally extend in axial direction DA.

Figure 6:
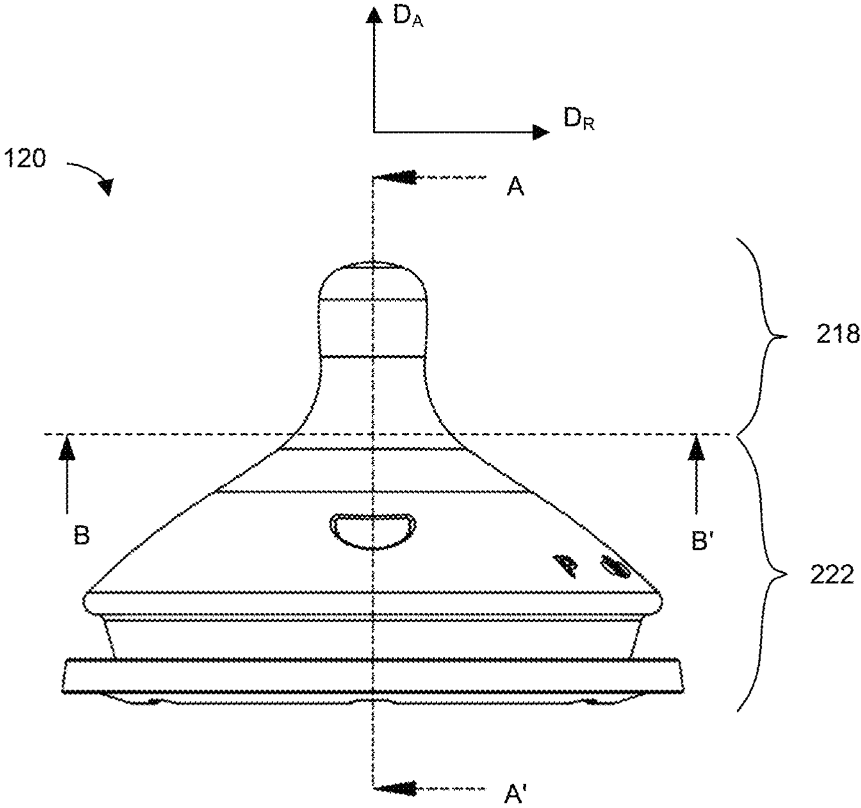
FIG. 6 is a side view of the nipple of the baby bottle, according to one embodiment.
Figure 7:
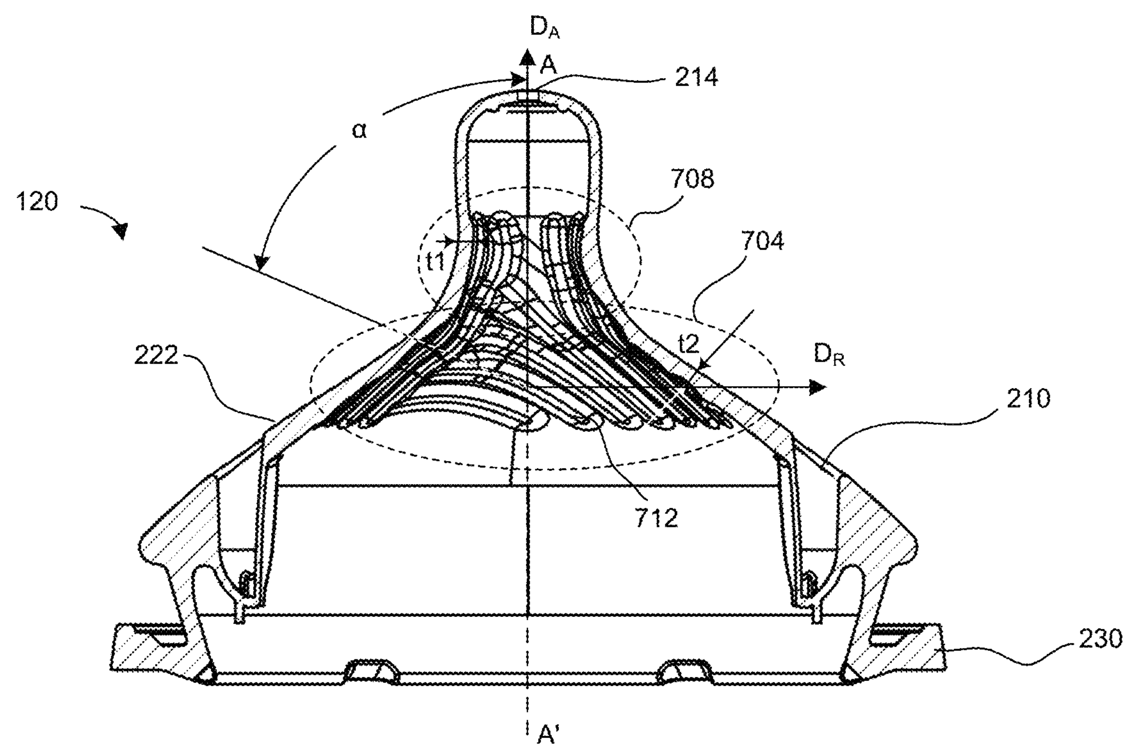
FIG. 7 is a cross-sectional view of the nipple of the baby bottle taken along line A-A' of FIG. 6, according to one embodiment.
Figure 8:
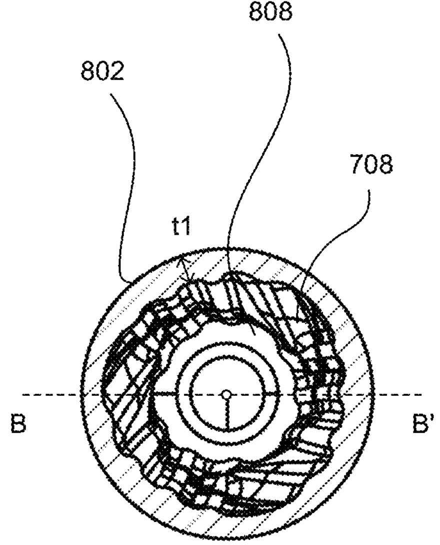
FIG. 8 is a cross-sectional view of the nipple of the baby bottle taken along line B-B' of FIG. 6, according to one embodiment.

FIG. 6 is a side view of nipple 120, according to one embodiment. FIG. 7 is a cross-sectional view of nipple 120 taken along line A-A' of FIG. 6; and FIG. 8 is a cross-sectional view of nipple 120 taken along line B-B' of FIG. 6, according to one embodiment. FIG. 7 illustrates biting portions 708 of ribs in elongated tip 218 while portions 704 of ribs are in base 222. In base 222, ribs 712 generally extend in a direction that forms angle α relative to axial direction DA of nipple 120, when projected onto a plane that is parallel to axial direction DA. Angle α may be selected to prevent biting region 708 of elongated tip 218 from collapsing due to squeezing or vacuum pressure generated by sucking actions while preventing collapsing of elongated tip 128 into base 222 along direction DA. In one or more embodiments, angle α may take range from 15 degrees to 80 degrees. Further, to better reinforce tip 128, additional axial directional ribs may be provided along at least part of elongated tip.

When silicone is used as the materials for nipple 120, thickness t1 of the wall at a valley between the ribs in elongated tip 218 is between 1 mm to 2.5 mm. The thickness of the wall generally increases in base 222. In one or more embodiments, thickness t2 of wall at a valley between the ribs in base 222 is 1 mm to 3 mm.

FIGS. 9A through 9C are diagrams showing flexing of nipple 120, according to one embodiment. Nipple 120 in its original shape 900 may undergo various types of deformation during bottle-feeding. Nipple 120 may be compressed in axial direction DA (as shown in deformed shape 910 of FIG. 9B) or elongated in the same direction during a natural bottle-feeding cycle. Similarly, elongated tip 218 of nipple 120 may be deformed in radial direction DR into deformed shape 920 by clenching or nibbling of elongated tip 218 by an infant. The ribs provided in the inner surface of nipple 120 enhance the elastic recovery in both types of deformation, and thereby facilitate and support the bottle-feeding activities of the infant.

Figure 10:
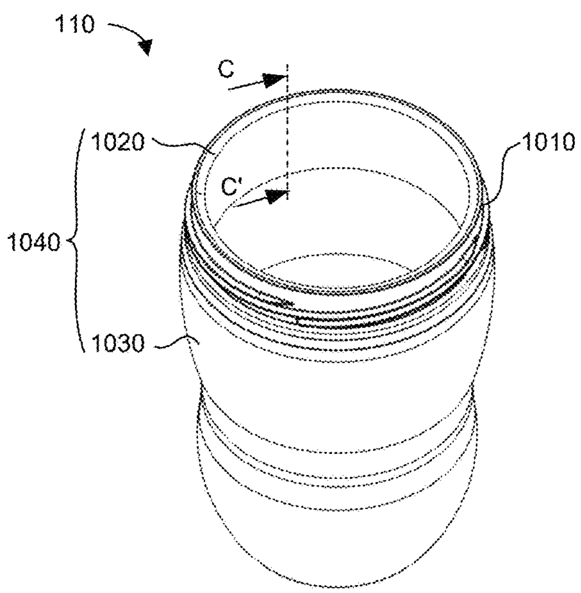
FIG. 10 is a perspective view of a container of the baby bottle, according to one embodiment.

FIG. 10 is a perspective view of container 110 of baby bottle 100, according to one embodiment. Container 110 includes rigid cylinder 1010 and resilient body 1040 for holding the fluid. Resilient body 1040 includes an upper part 1020 that is attached to rigid cylinder 1010 and a lower part 1030 that forms the majority of container 110. The bottom of the resilient body 1040 is closed. Container 110 may include other components not illustrated in FIG. 10.

In one or more embodiments, lower part 1030 is a unitary body made of resilient material such as silicone whereas upper part 1020 is made of rigid material such as plastic. The difference in the materials may impede the proper bonding between upper part 1020 and lower part 1030 during and after the manufacturing process. Hence, rigid cylinder 1010 may include structures that assist bonding of upper part 1020 of resilient body 1040.

Figure 11A:
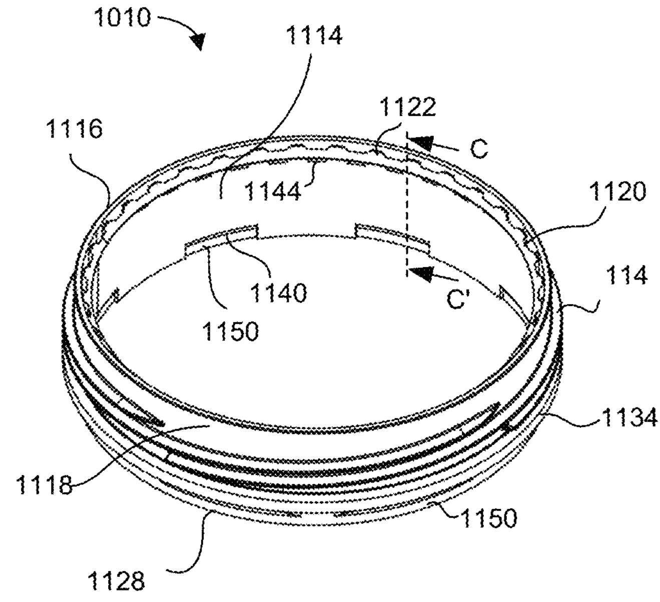
FIG. 11A is a perspective view of a rigid cylinder of the container, according to one embodiment.

FIG. 11A is a perspective view of rigid cylinder 1010, according to one embodiment. Rigid cylinder 1010 is of a cylindrical shape and includes an inner surface 1114, an outer surface 1118, a top surface 1116 and a bottom surface 1128. Top surface 1116 and bottom surface 1128 connect the inner surface 1114 and outer surface 1118, at the top and at the bottom, respectively. Outer surface 1118 is formed with screw 114 that meshes with screw 134 of collar 130. In one or more embodiments, inner surface 1114 is deposited with an adhesion layer of silicon compound to enhance the bonding of resilient body 1040 to rigid cylinder 1010.

Rigid cylinder 1010 also includes an inner ring 1120 that extends along the inner circumference of rigid cylinder 1010 and is connected to inner surface 1114 via legs 1122. Further, the bottom portion of rigid cylinder 1010 includes bridges 1150 and is formed with slits 1040 that extend between inner surface 1114 and outer surface 1118. Grooves 1144 are also formed in inner surface 1114 below the locations where legs 1122 attach to inner surface 1114. Slits 1140 penetrating between inner surface 1114 and outer surface 1118 are formed at the lower portion of rigid cylinder 1010. Bridges 1150 define the lower edges of slits 1140. These additional structures of rigid cylinder 1010 function to further prevent separation of resilient body 1040 from rigid cylinder 1010 during and after the manufacturing process.

Figure 11B:
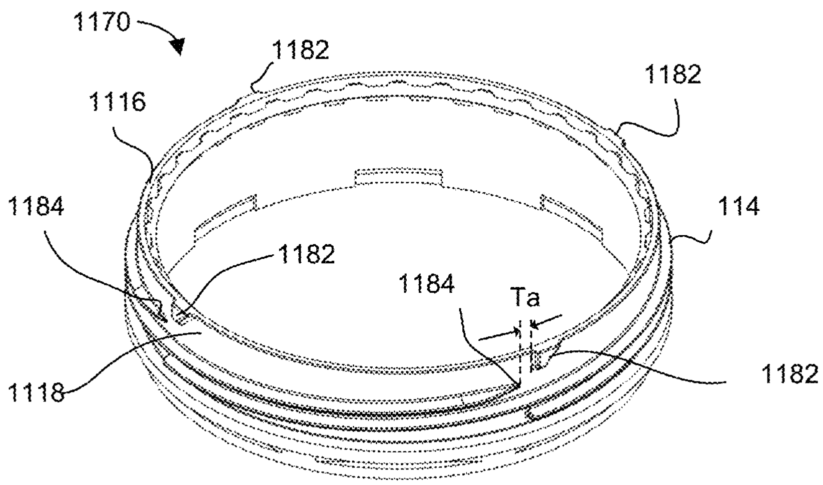
FIG. 11B is a perspective view of a rigid cylinder of the container, according to another embodiment.

FIG. 11B is a perspective view of rigid cylinder 1170, according to another embodiment. The rigid cylinder 1170 of FIG. 11B is substantially identical to the embodiment of rigid cylinder 1010 except that bumps 1182 are formed on its outer surface 1118 at top surface 1116 or near top surface 1116. Screw 114 of container 110 may include multiple threads. In rigid cylinder 1170, four screw threads are included in screw 114. To ensure proper mating of screw 114 of container 110 and its counterpart screw 134 of collar 130, bumps 1182 guide different segments of screw 134 to engage respective starting points 1184 of screw 114 simultaneously when assembling collar 130 onto container 110 by rotating container 110 and/or collar 130. If different segments of screw 114 engage respective starting points 1184 of screw 114 at different times, container 110 and collar 130 may not assemble properly and collar 130 may tilt relative to container 110. Such tilting may cause leakage of fluid within container 110. A gap Ta in a circumferential direction may be provided between the end point of bump 1182 and the starting point 1184 of screw 114.

In rigid cylinders 1170, 1184, screw 114 includes four screw portions starting at different starting points. In different embodiments, the number of screw threads of rigid cylinder may include more or fewer screw portions and corresponding number of starting points. In such case, the number of bumps may also match the number of screw portions.

Figure 12:
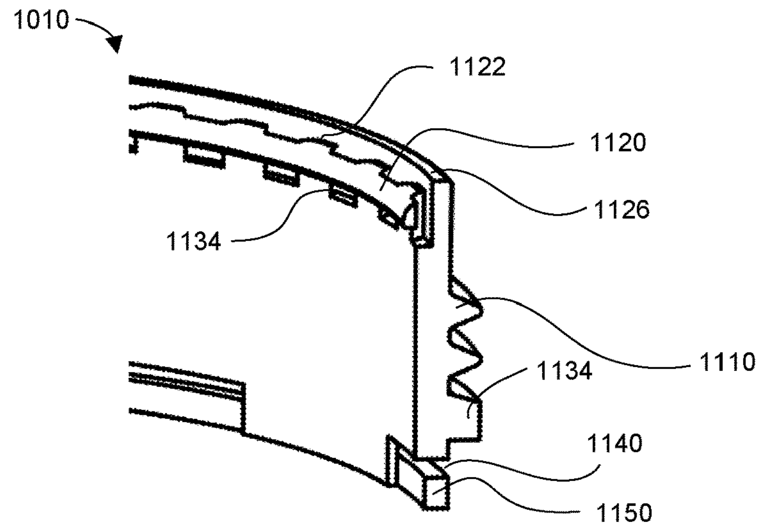
FIG. 12 is a cutaway view of the rigid cylinder of FIG. 11A, according to one embodiment.

FIG. 12 is a cutaway view of rigid cylinder 1010 cut along line C-C' of FIG. 11A, according to one embodiment. Rigid cylinder 1010 also has a rim 1134 that extends radially from outer surface 1118 of rigid cylinder 1010. Rim 1134 is engaged by clamp 1220 during an injection molding process to secure rigid cylinder 1010 and prevent heated or molten material (e.g., silicone) for forming resilient body 1040 from leaking out, as described below in detail with reference to FIG. 13. A part of screw 114 may also engage clamp 1220. Top surface 1116 of rigid cylinder 1010 also prevents the molten material from leaking during the injection molding process by abutting an upper core 1210.

Figure 13:
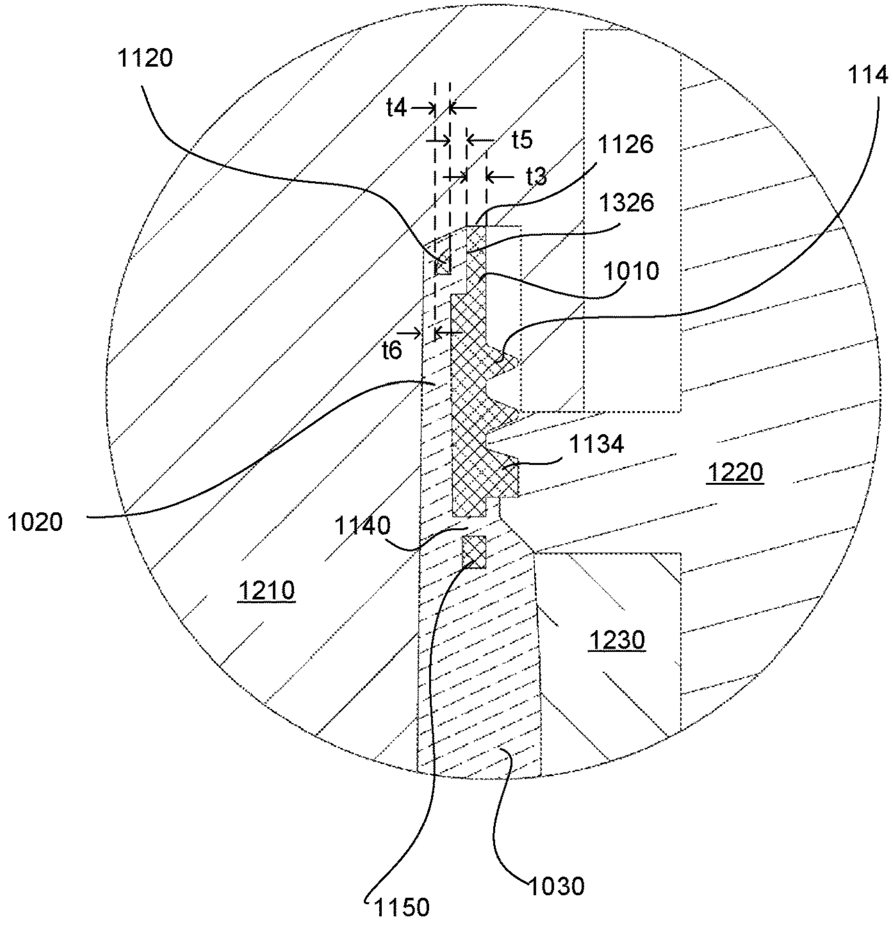
FIG. 13 is a sectional diagram of the container and a mold for injection molding, according to one embodiment.

FIG. 13 is a sectional diagram of the container rigid cylinder 1010 and a mold structure for injection molding resilient body 1040 onto rigid cylinder 1010, according to one embodiment. During the injection molding process, rigid cylinder 1010 is clamped by clamp 1220 and heated or molten material is injected into cavity formed between a lower core 1230 and upper core 1210. To prevent the heated or molten material from leaking through the interface between upper core 1210 and rigid cylinder 1010 through top surface 1126 of rigid cylinder 1010, top surface 1126 has a thickness of t3. By increasing thickness of t3, the length of interface between upper core 1210 and rigid cylinder 1010 is increased, which decreases the likelihood that the heated or molten material would leak through the interface. However, excessive thickening of t3 would increase the amount of material used in fabricating rigid cylinder 1010 due to increase in the volume of rigid cylinder 1010. In one embodiment, thickness t3 is in the range of 0.5 mm to 1 mm.

Inner ring 1120 functions to prevent detaching of the upper portion of resilient body 1040 from rigid cylinder 1010 when removing container 110 from upper core 1210 after the injection molding process is complete. If thickness t4 of inner ring 1120 is too thin, inner ring 1120 may break during the removal of container 110 from upper core 1210. However, if thickness t4 is too thick, the amount of resilient material between 1120 and an inner upper wall 1326 of rigid cylinder 1010 and/or the amount of resilient material between upper core 1210 and inner ring 1120 would decrease, which may result in tearing of upper part 1020 of resilient body 1040 during the process of removing container 110 from upper core 1210 after the injection molding process. In one embodiment, thickness t4 is between 0.3 mm and 0.8 mm. In one embodiment, distance t5 between inner ring 1120 and inner upper wall 1326 of rigid cylinder 1010 is in the range of 0.5 mm to 0.9 mm. Further, distance t6 between inner ring 1120 and upper core 1210 is in the range of 0.3 mm to 0.8 mm.

Slits 1140 receives heated or molten material during the injection molding process. In conjunction with bridges 1150, slits 1140 provide additional structure for attaching resilient body 1040 to rigid cylinder 1010 during and after the injection molding process.

The structures of rigid cylinder 1010, 1170 of FIGS. 11A through 13 are merely illustrative. Some structural elements of rigid cylinder 1010, 1170 may be omitted, additional elements to ensure attachment of resilient body 1040 to rigid cylinder 1010, 1170 may be added, or alternative structural elements may be used instead. For example, screw 1110, 1170 may be provided on inner surface 1114, and ring 1120 may be placed outside outer surface 1118.

Figure 14C:
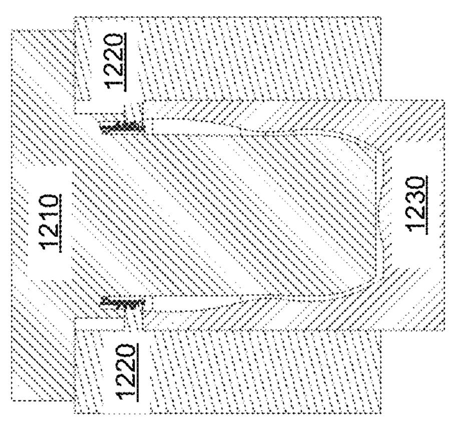
FIGS. 14A through 14F are diagrams illustrating the process of performing injection molding to form the container, according to one embodiment.
Figure 14B:
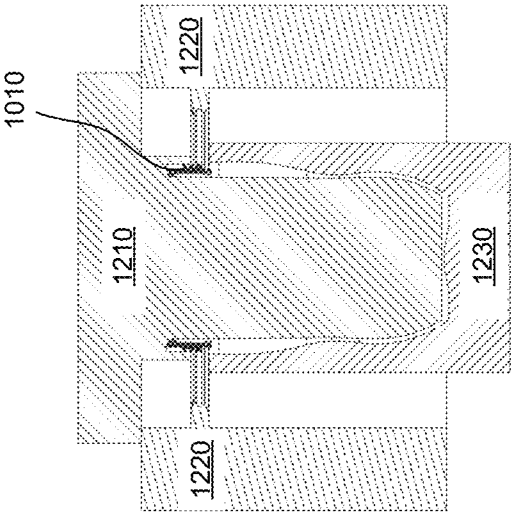
Figure 14A:
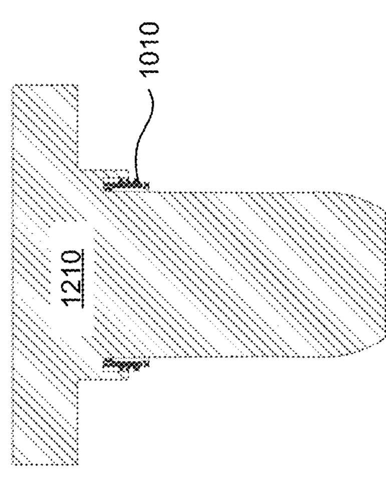
Figure 14A:
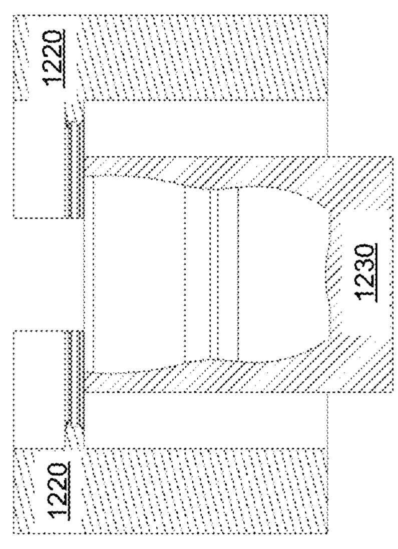

FIGS. 14A through 14F are diagrams illustrating the process of performing the injection molding process to form container 110, according to one embodiment. As shown in FIG. 14A, rigid cylinder 1010 is locked onto upper core 1210. Then, upper core 1210 and lower core 1230 make a relative movement so that a lower portion of upper core 1210 is inserted into the cavity of lower core 1230, as shown in FIG. 14B. In this way, an injection cavity is defined between upper core 1210 and lower core 1230 to receive the heated or molten material that is injected into the injection cavity with a predetermined level of pressure.

Then, clamp 1220 is moved laterally to clamp rigid cylinder 1010 as shown in FIG. 14C. Clamp 1220 locks rigid cylinder 1010 into place, and also prevents molten material from leaking out from the cavity. The direction in which clamp 1220 moves may be perpendicular to the direction of the relative movement of upper core 1210 and lower core 1230.

Figures 14D, 14E, 14F:
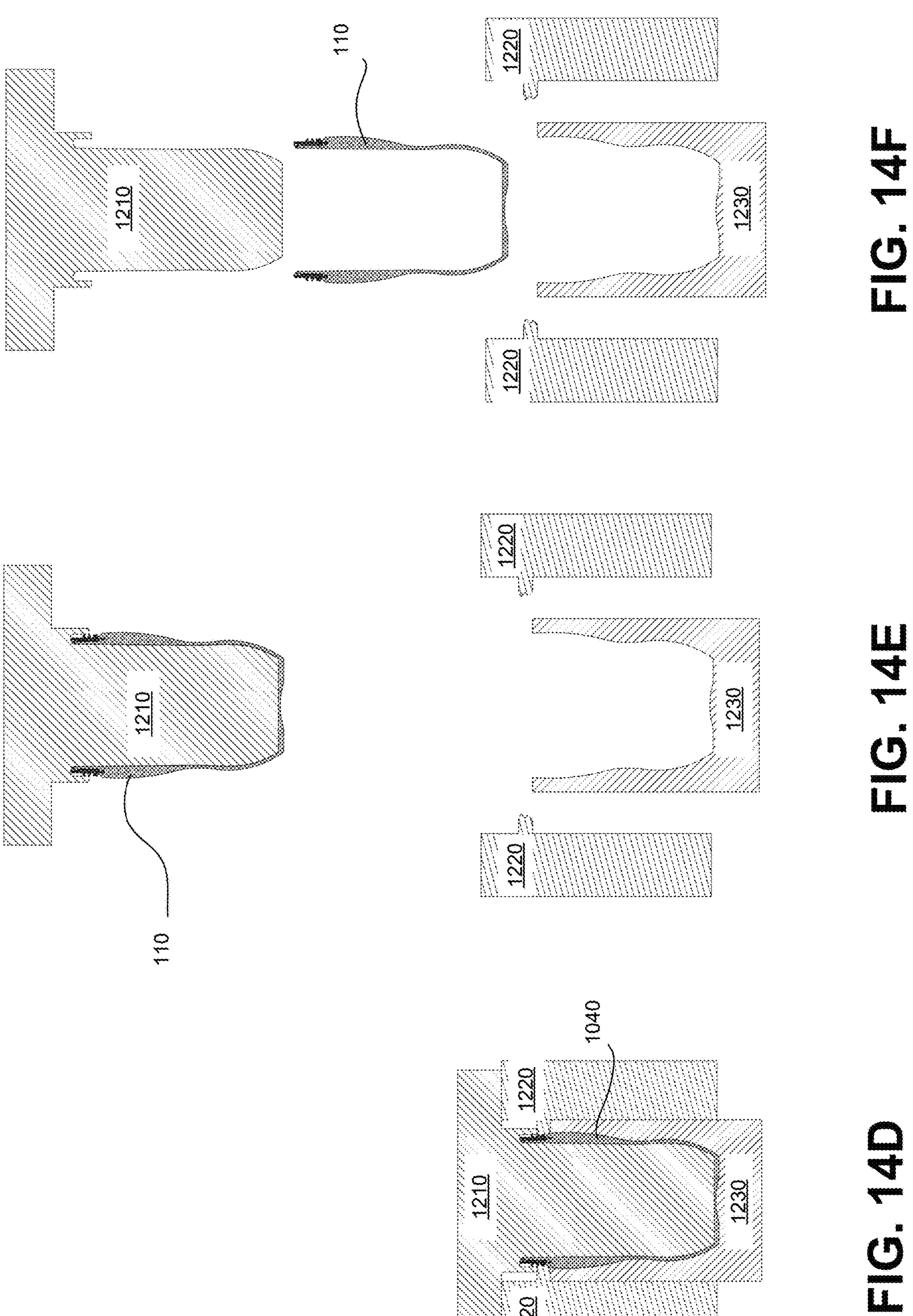

Subsequently, heated or molten material is injected into the injection cavity to form resilient body 1040, as shown in FIG. 14D. After the heated or molten material is cooled into resilient material, clamp 1220 is unclamped by moving laterally and upper core 1210 is separated from lower core 1230, as shown in FIG. 14E. Then container 110 is separated from upper core 1210.

One of many benefits of using the injection molding process of FIGS. 14A through 14F is that resilient body 1040 does not have any visible parting lines on its surface. Therefore, no separate postprocess is involved in removing the parting lines of the container from its surface and also provides more aesthetically pleasing shape. Further, the injection molding process beneficially prevents overflowing of heated or molten material over rigid cylinder 1010 by restricting clamps 1220.

Various modifications may be made to the process illustrated in FIGS. 14A through 14F. For example, the movement of the upper core 1210 and the clamp 1220 may be performed simultaneously instead of being sequential. Further, a mechanism may be provided to separate container 110 from upper core 1210 during the movement of upper core 1210.

Although the present disclosure has been described above with respect to several embodiments, various modifications can be made within the scope of the disclosure. Accordingly, the disclosure described above is intended to be illustrative, but not limiting.

What is claimed is:

1. A nipple for a baby bottle, comprising:

an elongated tip formed with one or more flow holes through which fluid flows, the elongated tip having an inner surface and an outer surface:

a base connected to the elongated tip and wider than the elongated tip, the base comprising an inner surface and an outer surface, the inner surface of the base facing downwards and connected to the inner surface of the elongated tip, and the outer surface of the base facing upwards and connected to the outer surface of the elongated tip; and ribs on at least a part of the inner surface of the base and configured to enhance elastic recovery of the nipple from elongation or contraction of the base in an axial direction of the nipple, the ribs slanted relative to an axial direction and a circumferential direction of the nipple, the ribs comprising a first subset of adjacent ribs and a second subset of adjacent ribs next to the first subset of adjacent ribs, upper ends of the first subset of adjacent ribs terminating within the inner surface of the base, and upper ends of the second subset of adjacent ribs terminating within the inner surface of the elongated tip.

2. The nipple of claim 1, wherein the ribs comprise three sets of ribs, portions of ribs in each of the sets of ribs oriented in different directions, one of the sets of ribs comprising the first subset of adjacent ribs and the second subset of adjacent ribs.

3. The nipple of claim 2, wherein the three sets of ribs comprise a first set of ribs oriented in a first direction and a second set of ribs oriented in a second direction, wherein a projection of the first direction onto a plane perpendicular to the axial direction forms an angle of 120 degrees relative to a projection of the second direction onto the plane.

4. The nipple of claim 1, wherein the nipple further comprises at least one check valve in the base.

5. The nipple of claim 4, wherein the one or more ribs are located between the at least one check valve and the one or more flow holes.

6. The nipple of claim 1, wherein a thickness of the base at locations without the one or more ribs is between 1.5 mm and 6 mm and a thickness of the elongated tip at locations without the one or more ribs is between 0.5 mm and 1.5 mm.

7. The nipple of claim 1, wherein the elongated tip, the base and the ribs form a unitary body.

8. The nipple of claim 7, wherein the elongated tip, the base and the ribs are made of silicone.

9. The nipple of claim 7, wherein the elongated tip, the base and the ribs are fabricated simultaneously by an injection molding.

10. The nipple of claim 1, wherein the outer surface of the base is formed with a plurality of flow indicators indicating different flow rates available on different nipples, and a marking associated with one of the flow indicators to indicate a flow rate of the nipple.

11. The nipple of claim 1, wherein the base further comprises a flange that is captured by a collar to secure the nipple to a container.

12. The nipple of claim 1, wherein the ribs in the elongated tip form helices.

13. A baby bottle comprising:

a nipple for the baby bottle, comprising:

an elongated tip formed with one or more flow holes through which fluid flows, the elongated tip having an inner surface and an outer surface, a base connected to the elongated tip and wider than the elongated tip, the base comprising an inner surface and an outer surface, the inner surface of the base facing towards a container of the baby bottle and connected to the inner surface of the elongated tip, and the outer surface of the base facing away from the container and connected to the outer surface of the elongated tip, and ribs on at least a part of the inner surface of the base and configured to enhance elastic recovery of the nipple from elongation or contraction of the base in an axial direction of the nipple, the ribs slanted relative to an axial direction and a circumferential direction of the nipple, the ribs comprising a first subset of adjacent ribs and a second subset of adjacent ribs next to the first subset of adjacent ribs, upper ends of the first subset of adjacent ribs terminating within the inner surface of the base, and upper ends of the second subset of adjacent ribs terminating within the inner surface of the elongated tip; and a container configured to hold the fluid and secure onto the nipple.

14. The baby bottle of claim 13, further comprising a collar for sealingly securing the nipple to the container.

15. The baby bottle of claim 13, wherein the container comprises:

a rigid cylinder comprising:

a first side surface formed with a screw for securing to a collar of the baby bottle, a second side surface at an opposite side of the first surface, a top surface connecting the first side surface and the second side surface, and a ring extending along a circumference of the second side surface and connected to the second side surface; and a resilient body comprising:

an upper portion with an opening end and secured to the rigid ring by receiving the ring of the rigid cylinder in a cavity formed along an upper circumference of the upper portion, and a lower portion with a closed end and extending from the upper portion.

16. The baby bottle of claim 15, wherein the first side surface of the rigid cylinder comprises one or more bumps protruding radially and configured to guide segments of a screw of the collar to engage starting points of the screw of the rigid cylinder.

17. The baby bottle of claim 16, wherein one or more end points of the one or more bumps are separated from a starting point of the screw in the circumferential direction.

18. The baby bottle of claim 15, wherein the second side surface comprises an inner surface of the rigid cylinder.

19. The baby bottle of claim 15, wherein the rigid cylinder further comprises legs connecting the ring to the second side surface, and wherein the legs extend from the second side surface radially in a repeating manner.

20. The baby bottle of claim 13, wherein the ribs in the elongated tip forming helices.

* * * * *